April 22, 1958     S. H. FAIRWEATHER     2,832,030
LOAD RATE CIRCUIT FOR ALTERNATOR CONTROL SYSTEMS
Filed Dec. 1, 1954     2 Sheets-Sheet 1
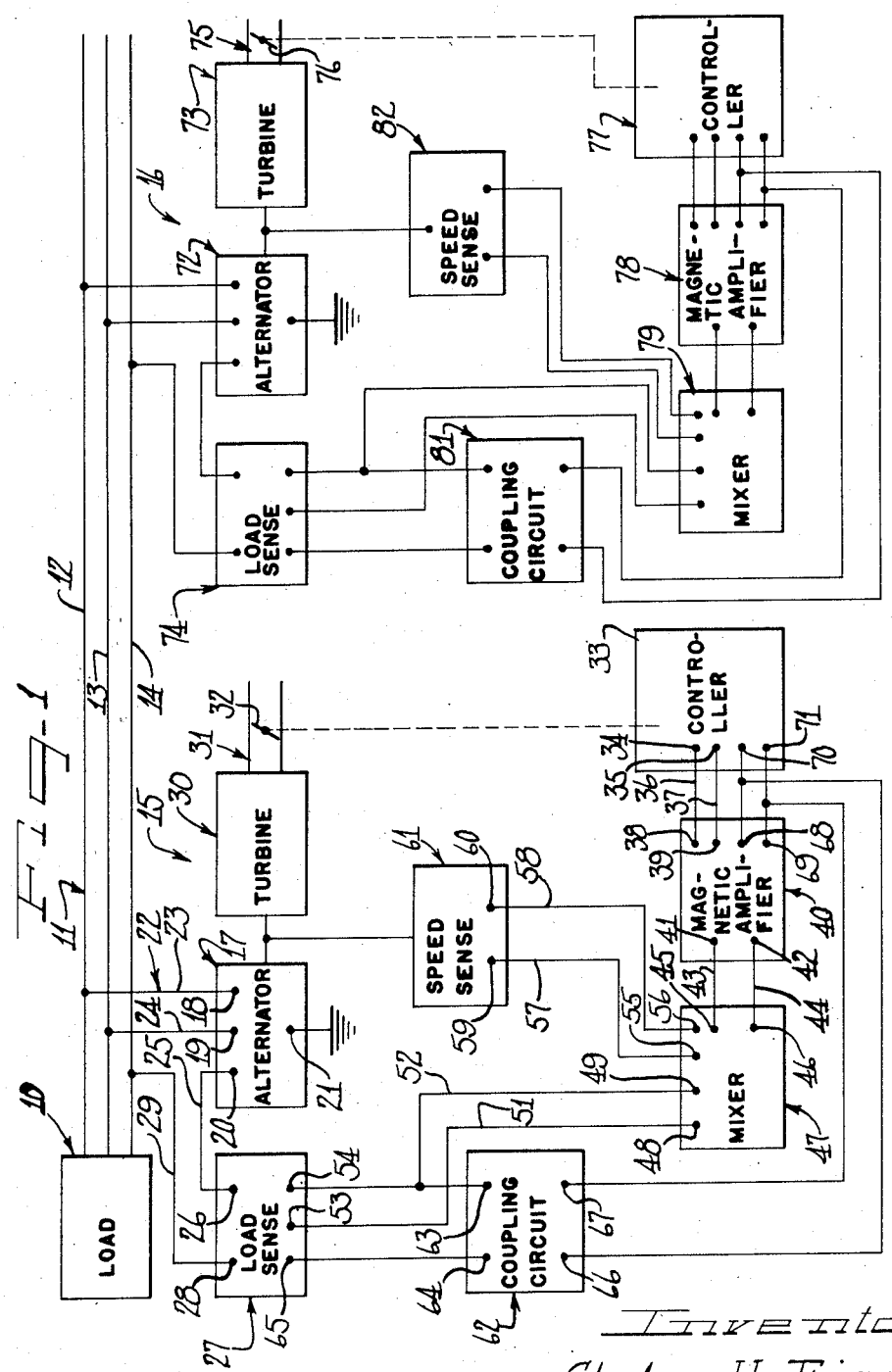
Inventor
Stephen H. Fairweather

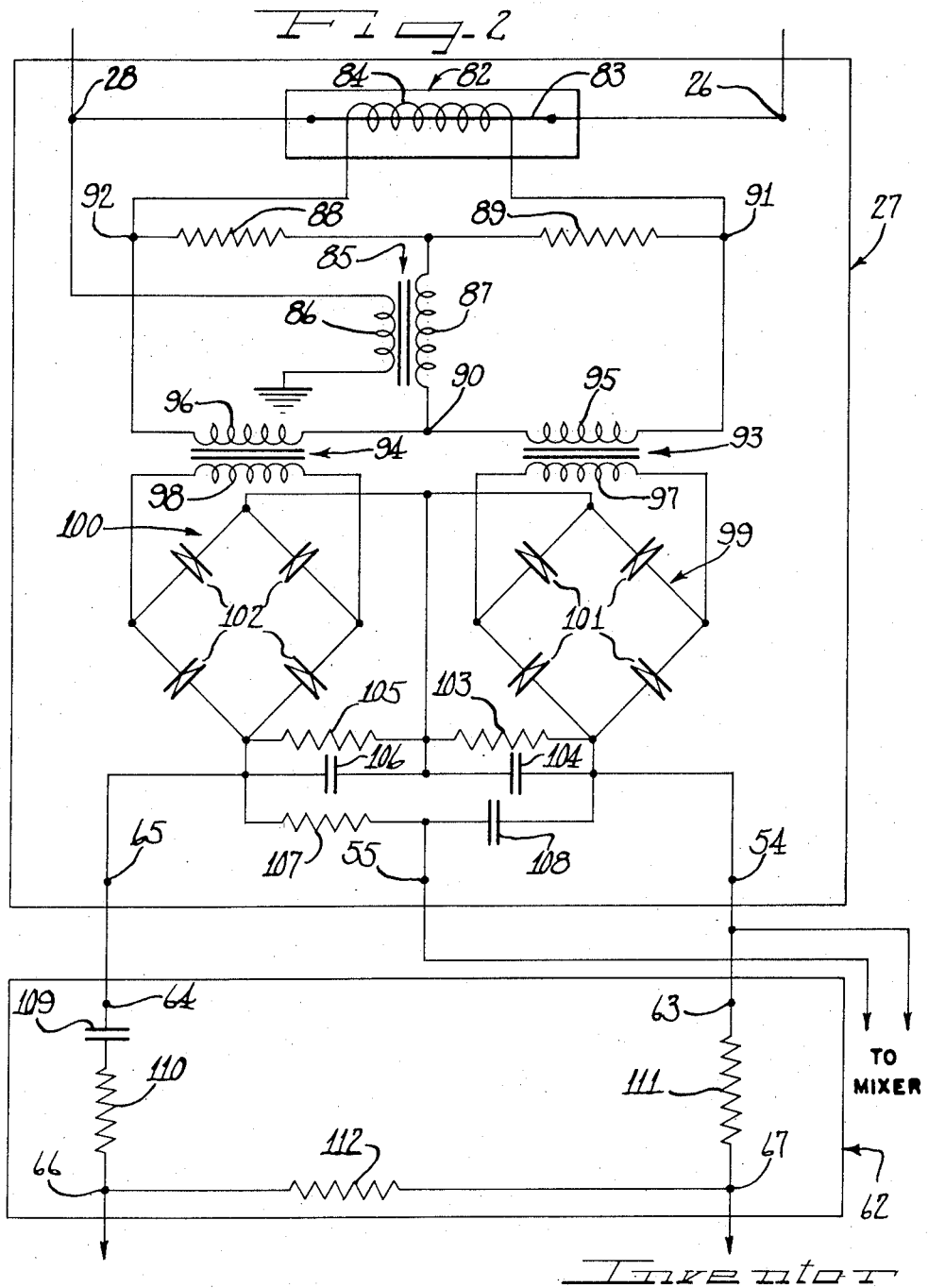

United States Patent Office 2,832,030
Patented Apr. 22, 1958

2,832,030

LOAD RATE CIRCUIT FOR ALTERNATOR CONTROL SYSTEMS

Stephen H. Fairweather, Euclid, Ohio, assignor to Thompson Products, Inc., Cleveland, Ohio, a corporation of Ohio Application December 1, 1954, Serial No. 472,343

4 Claims. (Cl. 322—23)

This invention relates to a load rate circuit for alternator control systems and more particularly to a circuit for increasing the speed of response of a control system in response to sudden changes in load.

In an exemplary application of this invention, a plurality of alternators are installed in an airplane to supply the electrical power required for various devices and apparatus in the airplane. The alternators may, for example, supply 400 cycle, 3-phase power. In normal operation, one alternator may supply sufficient power but the power requirements may at times exceed the capacity of one alternator and it may then be necessary to connect one or more other alternators in parallel therewith. It is, of course, desirable that only one alternator be operated when it can supply sufficient power.

Means are provided for controlling the drive and output of the alternators so that they can be readily operated in parallel and so that a proper load division therebetween can be achieved. Although other methods of control could be utilized, the outputs of the alternators are preferably controlled by controlling the air input to air turbines used to drive the alternator.

For this purpose, a controller may operate a valve in the air intake, the controller having input terminals connected to output terminals of a suitable amplifier such as a thyratron amplifier, an amplidyne or preferably a magnetic amplifier. The amplifier may have an input connected to a mixer which, in turn, is connected both to a load-sensing system for sensing the power output of the alternator and a speed-sensing system for sensing the speed of rotation of the alternator.

With this arrangement, the speed may be an exact function of load and independent of other factors and the relation between speed and load may be such that the alternators can be readily paralleled to achieve a proper load division therebetween. Most preferably, the speed decreases as the load increases to provide what may be termed a "scheduled droop characteristic."

It will be appreciated that in a system of this type, the controller that regulates the drive of the alternator should respond to sudden as well as slow changes in the load on the alternator. According to this invention, means are provided coupled to the controller and responsive to the load on the alternator for effecting instantaneous regulation of the alternator drive in response to sudden changes in the load on the alternator. Most preferably, such means comprises a differentiating circuit between the load-sensing means and the controller.

As previously indicated, the load-sensing and speed-sensing systems may be connected to a mixer which is connected to the input of a suitable amplifier connected to the controller. The differentiating circuit of this invention may be provided in the coupling from the load-sensing system to the mixer in a manner such that the signal applied from the load-sensing system to the mixer is dependent both on slow and sudden changes in the alternator load. With such an arrangement, the mixing circuit must have a correspondingly high response speed and, in addition, undesirable interaction between the signals from the load-sensing and speed-sensing systems can occur.

According to a specific feature of the invention, the circuit coupling the load-sensing system to the controller is independent of the coupling of the speed-sensing system to the controller.

For this purpose, the load-sensing system may be coupled through the differentiating circuit to a separate input of the amplifier. This arrangement is particularly advantageous because it is possible to use an integrating circuit (that is, a slowly responsive circuit) coupling the load-sensing system to the mixer to prevent the undesirable results mentioned above, while the coupling of the load-sensing system through the differentiating circuit to the controller insures fast response to sudden changes in the load.

In accordance with a further specific feature of the invention, the amplifier input to which the differentiating circuit is connected may be connected to means response to actuation of the controller, which modifies the overall action of the circuit to achieve an optimum response characteristic. With this arrangement, only two amplifier inputs are required. At the same time, there will be no undesirable interaction between the signal from the differentiating circuit and the signal from the means responsive to actuation of the controller because the signal from the differentiating circuit will ordinarily precede the signal from the means responsive to actuation of the controller.

An object of this invention, accordingly, is to provide an improved alternator control system in which means are provided for effecting instantaneous regulation of the alternator drive in response to sudden changes in the load on the alternator.

Another object of this invention is to provide an improved alternator control system including speed-sensing means for controlling the alternator drive with means responsive to sudden changes in the alternator load for effecting instantaneous regulation of the alternator drive.

This invention contemplates other objects, features and advantages which will become more fully apparent from the following detailed description taken in conjunction with the accompanying drawings which illustrate a preferred embodiment and in which:

Figure 1 is a schematic diagram illustrating in block form an alternator control system utilizing the load rate circuit of this invention; and Figure 2 is a schematic diagram illustrated in detail a portion of the circuit used in the system of Figure 1.

Reference numeral 10 designates a load to which a 3-phase supply line 11, including conductors 12, 13 and 14, may be connected. Power for the load 10 may be supplied from a pair of alternator systems 15 and 16 connected to the supply line 11, and additional alternator systems may be connected to the supply line 11, if desired. This system may be used in large airplanes, such as bombers or the like.

The alternator system 15 may comprise an alternator 17 having output terminals 18, 19 and 20 and a neutral terminal 21. The terminals 18, 19 and 20 may be connected through a branch supply line 22 to the main supply line 11 with the terminal 18 connected through a conductor 23 to conductor 12, with the terminal 19 connected through a conductor 24 to the conductor 13 and with the conductor 20 connected through a conductor 25 to one terminal 26 of a load-sensing system 27 having a second terminal 28 connected through a conductor 29 to the conductor 14 of the supply line 11. The alternator 17 may, for example, be a 400 cycle, 3-phase alternator and may be Y-connected with the neutral terminal 21 connected to ground.

A turbine 30 may be used to drive the alternator 17 with the turbine 30 being driven by pressurized air supplied through an air duct 31. Alternator output may be controlled through a valve 32 in the air supply duct 31, the valve 32, in turn, being controlled by a controller 33 which may have terminals 34 and 35 connected through conductors 36 and 37 to output terminals 38 and 39 of an amplifier 40. The amplifier 40 may be a thyratron-controlled amplifier or an amplidyne, or the like, but preferably it is a magnetic amplifier. The amplifier 40 may have input terminals 41 and 42 connected through conductors 43 and 44 to output terminals 45 and 46 of a mixer 47.

The mixer 47 has one pair of input terminals 48 and 49 connected through conductors 51 and 52 to output terminals 53 and 54 of the load-sensing system 27. The mixer 47 may also have a pair of input terminals 55 and 56 connected through conductors 57 and 58 to output terminals 59 and 60 of a speed-sensing system 61 driven from the alternator 17 or the turbine 30.

In operation of the system thus far described, the load-sensing system 27 and speed-sensing system 61 may supply signals which are combined in the mixer 47 and applied to the amplifier 40 which, through the controller 33, controls the valve 32 to operate the alternator 17 at a predetermined speed for any given value of load, independent of any other factor. Preferably, the speed may decrease as the load increases to give a predetermined drooping characteristic which, unlike the characteristic that would be obtained without the regulating system, is independent of any other factor, such as input air pressure, for example. This drooping speed-load characteristic, which may be termed a "scheduled droop," makes it possible to parallel a plurality of alternators and maintain a predetermined load division therebetween.

According to this invention, means are provided for controlling the drive of the alternator 17 in accordance with the rate of change of the load thereon. With a sudden increase in the load on the alternator 17, for example, the drive of the alternator 17 may be increased at a rapid rate so as to prevent a sudden decrease in the drive speed of the alternator.

For this purpose, a differentiating circuit is utilized which may be incorporated in the connection of the load-sensing system 27 to the mixer 47, but is preferably provided in a separate coupling system 62 having input terminals 63 and 64 respectively connected to the output terminal 54 and to another output terminal 65 of the load-sensing system 27, and having output terminals 66 and 67 connected to input terminals 68 and 69 of the magnetic amplifier 40, the terminals 68 and 69 being separate from the terminals 41 and 42 connected to the output of the mixer 47. The advantages of having the coupling circuit 62 independent of the coupling from the speed-sensing system 61 to the controller 33 were outlined above.

The coupling circuit 62, as well as the load-sensing system 27 will be described in detail hereinafter in connection with Figure 2. It may be noted, at this point, however, that the input terminals 68 and 69 of the magnetic amplifier 40 may be connected to terminals 70 and 71 of the controller 33 which may incorporate means responsive to movement of the valve 33 for applying a corresponding signal to the terminals 70 and 71, this arrangement being effective to modify the action of the control system to achieve optimum results. The controller 33 may preferably be constructed in a manner as disclosed in the copending application of William L. Hinde, Fred H. Guth and Stephen H. Fairweather entitled "Displacement Sensing System," filed August 2, 1954, Serial No. 447,360. The speed-sensing system 61 may be constructed as disclosed in the copending application of Stephen H. Fairweather entitled "Speed-Sensing System," filed July 15, 1954, Serial No. 443,482.

The alternator system 16 may be identical to the system 15 and may comprise an alternator 72, a turbine 73, a load-sensing system 74, an air duct 75, an air valve 76, a controller 77, an amplifier 78, a mixer 79, a speed-sensing system 80 and a coupling circuit 81 corresponding to the same elements in the alternator system 15.

Referring now to Figure 2, the load-sensing system 27 and the coupling circuit 62 are illustrated in detail. The load-sensing system 27 is substantially the same as that disclosed in the copending application of Stephen H. Fairweather and Kurt Seldner entitled "Load-Sensing System," filed July 15, 1954, Serial No. 443,483. In particular, the load-sensing system 61 may comprise a current transformer 82 having a primary 83 in the form of a straight wire connected between the terminals 26 and 28 in a secondary 84 in the form of a coil wound around the primary 83. A voltage transformer 85 has a primary 86 connected between the terminal 28 and ground and a secondary 87. The secondary 87 of the voltage transformer 85 and the secondary 84 of the current transformer 82 are so connected as to obtain one signal proportional to the vector sum of voltages proportional to and in fixed phase relation to alternator current and voltage and a second signal proportional to the vector difference between such voltages. For this purpose, a pair of resistors 88 and 89, preferably having equal resistances, may be connected in series across one of the secondary windings such as the secondary winding 84 of the transformer 82. The junction between the resistors 88 and 89 is connected to one end of the other secondary, the voltage transformer secondary 87. With this arrangement, the voltage appearing between the other end of the voltage transformer secondary 87, at a circuit point 90, and one end of the current transformer secondary 84, at a circuit point 91, will be proportional to the vector sum of a voltage proportional to and in fixed phase relation with alternator voltage. Likewise, the voltage appearing between the circuit point 90 and a circuit point 92 connected to the other side of the current transformer secondary 84 will be proportional to the vector difference between such voltages.

The signal appearing between the circuit points 90 and 91 and the signal appearing between circuit points 90 and 92 are each rectified and then the rectified signals are combined to give an output signal indicative of power. For this purpose, a pair of coupling transformers 93 and 94 are provided having primaries 95 and 96 and secondaries 97 and 98, respectively. The primary 95 may be connected between the circuit points 90 and 91 while the primary 96 may be connected between the circuit points 90 and 92. The secondaries 97 and 98 may be connected to separate rectifier means 99 and 100 each of which may be a full-wave bridge rectifier utilizing selenium rectifier elements, the rectifier means 99 comprising four selenium rectifier elements 101, and the rectifier means 100 comprising four selenium rectifier elements 102.

Before combining the outputs of the rectifier means 99 and 100, each of such outputs is filtered. For this purpose, a resistor 103 and a capacitor 104 are connected in parallel across the output of the rectifier means 99 and a resistor 105 and a capacitor 106 are connected in parallel across the output of the rectifier means 100. These outputs are combined and the difference between the rectified, filtered output of the rectifier means 99 and the rectified, filtered output of the rectifier means 100 appears between the output terminals 54 and 65.

For the reasons described in detail in the above-mentioned copending application of Stephen H. Fairweather and Kurt Seldner entitled "Load-Sensing System," the votlage appearing between the terminals 54 and 65 is proportional to the power output of, or load on, the alternator 17.

The output terminal 55 of the load-sensing system 27, which terminal together with the terminal 54 are connected to the mixer 47, could be connected directly to the terminal 65. However, it is desirable, to prevent undesirable interaction with the output of the speed-sensing system 61, and to improve the accuracy of the load-sensing system 27, to provide an integrating or slowly responsive filtering circuit between the signal developed between terminals 54 and 65 and the input terminals of the mixer 47. For this purpose, a resistor 107 is connected between the terminal 65 and the terminal 55, and a capacitor 108 is connected between the terminal 55 and the terminal 54.

The coupling circuit 62, as previously indicated, comprises a differentiating circuit. This circuit may comprise a capacitor 109 between the terminal 64 and the terminal 66. It is not necessary, but a resistor 110 is preferably connected in series with the capacitor 109 between the terminals 64 and 66 and a resistor 111 is provided in the connection of the terminal 63 to the terminal 67. These resistors decrease the capacitance of the capacitor 109 required for a given time constant and also serve to decouple the output of the load-sensing system 27 from the input of the magnetic amplifier 40 appearing at terminals 68 and 69 and the output of the controller 33 appearing at the terminals 70 and 71.

A resistor 112 may be connected between the terminals 66 and 67. This resistor 112 is not necessary with the amplifier 40 in the form of a magnetic amplifier having a relatively low input impedance. However, if the amplifier 40 should have a high input impedance, the resistor 112 may be used to obtain a short time constant without necessitating an extremely small capacitance for the capacitor 109.

In operation, if the load on the alternator 17 should suddenly change, a voltage will rapidly be developed across the output terminals 54—65 of the load-sensing system 27. Since the voltage across the capacitor 109 cannot change instantaneously, this voltage developed across the terminals 54—65 is applied to the input of the magnetic amplifier 40 at terminals 68—69 in proportion to the impedance between terminals 68—69 relative to the resistance of the resistors 110, 111 plus such impedance. The magnetic amplifier 40 will then serve to apply an amplified signal to the input terminals 34—35 of the controller 33 and the controller 33 will open or close the valve 32 so as to increase or decrease the drive of the alternator 17 and prevent or minimize the change in the drive speed of the alternator 17. The capacitor 109 will, however, charge up within a time period corresponding to the time constant of the differentiating circuit, and the circuit will have no ultimate effect on the drive speed of the alternator. The stable drive speed of the alternator 17 will, of course, be determined accurately by the voltage developed between the terminals 54—55 of the load-sensing system 27. The circuit of this invention thus achieves a very fast and yet extremely accurate control of alternator speed.

It will be understood that modifications and variations may be effected without departing from the spirit and scope of the novel concepts of the present invention.

I claim as my invention:

1. In a drive control system for an alternator, a controller for regulating the drive of the alternator, speed-sensing means for developing a signal responsive to the speed of the alternator, load-sensing means for developing a signal responsive to the load on the alternator, an amplifier coupled to said controller and having a plurality of inputs, means coupling said load and speed-sensing means to one of said inputs to obtain a certain speed-load characteristic, and a differentiating circuit coupling said load-sensing means to another of said inputs and arranged to apply to said another of said inputs a signal proportional to the rate of change of load to thereby obtain fast response to sudden changes in load.

2. In a drive control system for an alternator, a controller for regulating the drive of the alternator, speed-sensing means for developing a signal responsive to the speed of the alternator, load-sensing means for developing a signal responsive to the load on the alternator, an amplifier coupled to said controller and having a plurality of inputs, means for connecting the output of said speed-sensing means to one of said inputs, means including an integrating circuit for connecting the output of said load-sensing means to said one of said inputs, and a differentiating circuit coupling the output of said load-sensing means to another of said inputs and arranged to apply to said another of said inputs a signal proportional to the rate of change of load to thereby obtain fast response to sudden changes in load.

3. In a drive control system for an alternator, a controller for regulating the drive of the alternator, speed-sensing means for developing a signal responsive to the speed of the alternator, load-sensing means for developing a signal responsive to the load on the alternator, an amplifier coupled to said controller and having a plurality of inputs, means coupling said load and speed-sensing means to one of said inputs to obtain a certain speed-load characteristic, and a differentiating circuit including a series capacitor coupling said load-sensing means to another of said inputs and arranged to apply to said another of said inputs a signal proportional to the rate of change of load to thereby obtain fast response to sudden changes in load.

4. In a drive control system for an alternator, a controller for regulating the drive of the alternator, speed-sensing means for developing a signal responsive to the speed of the alternator, load-sensing means for developing a signal responsive to the load on the alternator, an amplifier coupled to said controller and having a plurality of inputs, means for connecting the output of said speed sensing means to one of said inputs, resistance and capacitance means connected in series across the output of said load sensing means, means for applying the signal developed across said capacitance means to said one of said inputs, and a differentiating circuit coupling said load-sensing means to another of said inputs and arranged to apply to said another of said inputs a signal proportional to the rate of change of load to thereby obtain fast response to sudden changes in load.

References Cited in the file of this patent

UNITED STATES PATENTS

| | | |
|---|---|---|
| 2,509,728 | Desch et al. | May 30, 1950 |
| 2,610,315 | McKendry et al. | Sept. 9, 1952 |
| 2,721,305 | Steinitz | Oct. 18, 1955 |